Patented May 29, 1951

2,555,050

UNITED STATES PATENT OFFICE 2,555,050

PRODUCTION OF POLYVINYL ALCOHOL-MALEIC ACID-ACETIC ACID ESTERS

Ralph Robert Lyne, Wimbledon, England, and Arthur W. S. Clark, Glasgow, Scotland, assignors to Imperial Chemical Industries Limited, a corporation of Great Britain No Drawing. Application July 8, 1947, Serial No. 759,724. In Great Britain August 16, 1946

3 Claims. (Cl. 260—78.5)

The present invention relates to the production of polyvinyl ester derivatives and is particularly concerned with a method for the production of an acid ester of a partially esterified polyvinyl alcohol in which the vinyl alcohol groups are partly converted into maleic ester groups and partly acetylated and partly unaltered.

These polyvinyl acetate maleate derivatives can easily be brought into aqueous solution in the presence of a weak alkali for example sodium carbonate insufficient to cause noticeable hydrolysis and these aqueous solutions have been found to have excellent emulsifying and the like properties.

In accordance with prior proposals water soluble salts of polyvinyl acetate maleate derivatives of the required vinyl alcohol content were prepared as water-swellable jellies containing excess alkali or excess electrolyte formed by neutralising the alkali excess. The excess alkali or the resulting excess electrolyte was due to the necessity of having to employ excess caustic alkali for hydrolysing the material formed by heating polyvinyl acetate with maleic acid, so as to form a derivative of the desired polyvinyl alcohol content. However, in order that the said salts of the polyvinyl acetate maleate derivatives should imbibe sufficient water to convert them into solutions having emulsifying properties it was necessary to remove thoroughly the said electrolytes and this was troublesome to effect.

In contradistinction to such prior proposals we have now found that we can form the free acid of a polyvinyl acetate maleate derivative of the required vinyl alcohol content by heating polyvinyl acetate, maleic acid or its anhydride and water and that the free acid thus formed, which is in a jelly-like condition, can be subsequently dissolved in water in the presence of a quantity of a weak alkali, as for example, sodium carbonate insufficient to cause noticeable hydrolysis.

According to the present invention, therefore, the method for the production of an acid ester of a partially esterified polyvinyl alcohol of the required composition in which the vinyl alcohol groups are partly converted into maleic ester groups and partly acetylated and partly unaltered comprises heating a mixture of polyvinyl acetate, maleic acid and water.

Preferably the maleic acid is used as its anhydride in the presence of a quantity of water more than is required to convert the anhydride into maleic acid.

The composition of the acid ester of the partially esterified vinyl alcohol will vary according to the relative proportion of the polyvinyl acetate, maleic acid or maleic anhydride, and water and upon the temperature and period of time of heating.

A suitable ratio of the polyvinyl acetate to the maleic acid is two to one.

Preferably the vinyl alcohol content of the resulting acid ester of the partially esterified polyvinyl alcohol is in excess of 9 per cent.

Th resulting acid ester of the partially esterified polyvinyl alcohol can be dissolved in water containing in solution an alkali metal carbonate in an amount equivalent to the acid value of the partially esterified ester. It is found that aqueous solutions of polyvinyl derivatives of greatly improved stability are obtained and that they are extremely stable even in the presence of water soluble electrolytes. For example, it has been found that it is possible to produce aqueous emulsions of a mineral oil, including as emulsifying agents some of the acid aqueous solutions of the polyvinyl ester derivatives prepared according to the method of the present invention, sufficiently stable to be unaffected by the presence of nickel nitrate, and to remain unaffected after several months' storage in the presence of the nickel nitrate.

It is sometimes desirable and more convenient to heat a mixture of polyvinyl acetate, maleic anhydride, and water, instead of polyvinyl acetate, maleic acid, and water. For example heating a mixture of 1200 grams polyvinyl acetate, 550 grams maleic anhydride, and 350 grams water, leads to the production of an acid ester of a partially esterified polyvinyl alcohol having a vinyl acetate content of 55.6% and a vinyl alcohol content of 12.8%.

It is to be appreciated that according to the present invention the acid polyvinyl ester derivatives can be prepared of varying composition, that is to say, we can alter the composition of the final compound according to the relative proportions of the polyvinyl acetate, maleic acid, or maleic anhydride, and water, used.

The composition of the polyvinyl maleate acetates produced when 1200 grams of polyvinyl acetate and 550 grams of maleic anhydride are heated with 100, 150, 250, and 350 grams of water at a temperature of 155° C. for 1½–2 hours can be analysed and expressed in terms of monovinyl maleate, vinyl acetate, and vinyl alcohol, and from the following table showing the stability of two emulsions of definite composition when prepared with the polyvinyl maleate acetate of differing compositions it will be seen that a good emulsifying agent is produced if the vinyl alcohol content of the resin is in excess of 10%.

Table

| Water Content | Analysis of polyvinyl maleate acetate in terms of— | | | Emulsion stability | |
|---|---|---|---|---|---|
| | Vinyl maleate | Vinyl acetate | Vinyl alcohol | Emulsion No. 1 | Emulsion No. 2 |
| | Per cent | Per cent | Per cent | | |
| 100 | 17.3 | 76.3 | 6.4 | 8 days | 7 days. |
| 150 | 35.9 | 56.7 | 7.4 | 2 months | 2 months. |
| 250 | 19.0 | 69.7 | 11.3 | Over 3 months | Over 3 months. |
| 350 | 31.6 | 55.6 | 12.8 | ----do---- | Do. |

Emulsion No. 1 is prepared from Brunswick green and nitrocellulose linseed oil leather lacquer in the following manner. The lacquer phase is made up as follows:

Parts by weight
Nitrocellulose (11.8–12.3% nitrogen content and such that a solution of 20 grams in 100 ccs. of aqueous acetone consisting of 95 ccs. pure acetone and 5 ccs. distilled water has a viscosity of 30 c. g. s. units at 20° C.) _____ 7.7
Mid Brunswick green _____ 6.8
Blown linseed oil _____ 20.1
Blown castor oil _____ 5.1
Castor oil _____ 2.3
Butyl alcohol _____ 3.4
Butyl acetate _____ 21.9
Ethyl acetate _____ 10.0
Toluene _____ 12.6
Methyl cyclohexanone _____ 10.1

The aqueous phase is made up to have the following composition:

Parts by weight
Polyvinyl acetate maleate partially hydrolysed resin made according to the invention ____ 3
Water _____ 97

Emulsion No. 1 is prepared by the emulsification of the lacquer phase in the aqueous phase in the ratio of 2.75 to one by weight.

Emulsion No. 2 is an emulsion of a green pigmented nitrocellulose lacquer prepared in the following manner. The lacquer phase is made up as follows:

Parts by Weight
Nitrocellulose (of 11.8–12.3% nitrogen content and such that a solution of 20 grams in 100 ccs. of aqueous acetone consisting of 95 ccs. pure acetone and 5 ccs. distilled water has a viscosity of 30 c. g. s. units at 20° C.) _____ 10.2
Mid Brunswick green _____ 8.9
Blown linseed oil _____ 1.5
Castor oil _____ 3.0
Butyl alcohol _____ 4.8
Ethyl acetate _____ 12.9
Methyl cyclohexanone _____ 13.3
Butyl acetate _____ 28.7
Toluene _____ 16.7

The aqueous phase is made up to have the following compositions:

Parts by weight
Polyvinyl acetate maleate partially hydrolysed resin made according to the invention ____ 3
Water _____ 97

Emulsion No. 2 is prepared by emulsification of the lacquer phase in the water phase in the ratio of 2.75 to one by weight.

From various considerations such as compatibility tests with nitrocellulose and interfacial tension experiments a preferred composition is monovinyl maleate 25 parts, vinyl acetate 60 parts, vinyl alcohol 15 parts but these figures may vary between wide limits.

The invention is illustrated by the following examples, wherein the parts and percentages are by weight unless otherwise indicated.

Example 1

550 parts maleic anhydride, broken into lumps of a suitable size are placed with 350 parts water in a powerful mixer which is capable of being heated. When the maleic anhydride has been reduced to a suitable slush 1200 parts of powdered polyvinyl acetate of molecular weight about 11,000 are added gradually. The temperature of the mixture is then raised to 150–160° C., and the stirrers worked both at such a rate that the said polyvinyl acetate is homogeneously mixed and uniformly heated without charring. The mixture is inspected frequently. After having reached 150–160° C. the viscosity remains constant for some time and then increases. When this increase takes place, the mixture is cooled to 99° C. with cold water and the source of heat removed. Boiling water is then added and the material washed till the content of unreacted acid has fallen to negligible proportions.

If it is desired to dissolve this material in water 100 parts of sodium carbonate are added together with a suitable amount of hot water in such a way as to give a thin uniform jelly. If the quantity of sodium carbonate added is found to be insufficient to give neutrality further small additions can be made. Further quantities of water can be added if desired.

Example 2

650 parts maleic acid and 250 parts water are placed in a powerful mixer and to the slush so formed 1200 parts of polyvinyl acetate of molecular weight about 11,000 are added in the form of powder or small lumps. The mixing, heating and washing are conducted as in Example 1. If desired the resulting material can be dissolved in water also as in accordance with Example 1.

Example 3

650 parts of maleic acid and 1200 parts of polyvinyl acetate of molecular weight of about 11,000 in the form of small lumps are mixed together in a powerful mixer until a powder is formed. The temperature may be raised during this operation but should not exceed 100° C. 300 parts of water are then added and the temperature of the mixture is raised to 150–160° C. From now onwards the procedure is as in Example 1.

If desired the resulting material can be dissolved in water as in accordance with Example 1.

We claim:

1. A method for the production of an acid ester of polyvinyl alcohol partially esterified with maleic acid groups and with acetic acid groups having a vinyl alcohol content in excess of 9% which comprises heating polyvinylacetate and maleic acid, in ratio of about 2 parts acetate to each part acid together with water at a temperature of about 150 to 160° C. for about 1½ to 2 hours in the substantial absence of any other materials.

2. A method for the production of an acid ester of polyvinyl alcohol partially esterified with maleic acid groups and with acetic acid groups having a vinyl alcohol content in excess of 9% which comprises heating polyvinyl acetate, maleic acid and water together at a temperature of about 150 to 160° C. for about 1½ to 2 hours in the substantial absence of any other materials, with said three reactants being present in the ratio of between 10 to 35 parts of water and 55 to 65 parts of maleic acid for every 120 parts of polyvinyl acetate.

3. A method for the production of an acid ester of polyvinyl alcohol partially esterified with maleic acid groups and with acetic acid groups having a vinyl alcohol content in excess of 9% which comprises heating polyvinyl acetate, a material from the group consisting of maleic acid and maleic anhydride, and water together at a temperature of about 150° to 160° C. in the substantial absence of any other materials, with said three reactants being present in the ratio of between 10 to 35 parts of water and 55 to 65 parts of said material for every 120 parts of polyvinyl acetate.

RALPH ROBERT LYNE.
ARTHUR W. S. CLARK.

REFERENCES CITED

The following references are of record in the file of this patent:

UNITED STATES PATENTS

| Number | Name | Date |
| --- | --- | --- |
| 2,145,345 | Dreyfus | Jan. 31, 1939 |
| 2,275,685 | Salo | Mar. 10, 1942 |